(12) United States Patent
Vestergaard-Frandsen et al.

(10) Patent No.: US 11,884,533 B2
(45) Date of Patent: Jan. 30, 2024

(54) WATER CONTAINER WITH MANUAL DISPENSING VALVE

(71) Applicant: LIFESTRAW SARL, Lausanne (CH)

(72) Inventors: Mikkel Vestergaard-Frandsen, Tiburon, CA (US); Alison Hill, Reisterstown, MD (US); Jean-Luc Madier, Divonne les Bains (FR); Mathieu Corbineau, Bern (FR); Lionel Sabourin, St Baldoph (FR); Jean-Marc Pascal, Voreppe (FR)

(73) Assignee: LIFESTRAW SÀRL, Lausanne (CH)

( * ) Notice: Subject to any disclaimer, the term of this patent is extended or adjusted under 35 U.S.C. 154(b) by 0 days.

(21) Appl. No.: 17/995,358

(22) PCT Filed: Mar. 25, 2021

(86) PCT No.: PCT/EP2021/057840
§ 371 (c)(1),
(2) Date: Oct. 3, 2022

(87) PCT Pub. No.: WO2021/198042
PCT Pub. Date: Oct. 7, 2021

(65) Prior Publication Data
US 2023/0150810 A1    May 18, 2023

Related U.S. Application Data

(60) Provisional application No. 63/005,084, filed on Apr. 3, 2020.

(51) Int. Cl.
*B67D 3/00* (2006.01)
*B65D 47/24* (2006.01)
*B67D 3/04* (2006.01)
*C02F 1/00* (2023.01)

(52) U.S. Cl.
CPC ......... *B67D 3/0061* (2013.01); *B65D 47/247* (2013.01); *B67D 3/043* (2013.01); *B67D 3/047* (2013.01); *B67D 2210/0001* (2013.01); *C02F 1/001* (2013.01); *C02F 2201/005* (2013.01)

(58) Field of Classification Search
CPC .......... B67D 3/0061; B67D 2210/0001; B67D 3/043; B67D 3/047; B65D 47/247; C02F 1/001; C02F 2201/005
See application file for complete search history.

(56) References Cited

U.S. PATENT DOCUMENTS

| 4,905,743 A | 3/1990 | Gray |
| 5,927,557 A * | 7/1999 | Busick ............ B67D 3/04 222/554 |
| 5,944,225 A * | 8/1999 | Kawolics ............ B67D 3/04 222/131 |

(Continued)

FOREIGN PATENT DOCUMENTS

| EP | 0165494 A1 | 12/1985 |
| EP | 2679545 A1 | 1/2014 |

*Primary Examiner* — Frederick C Nicolas
(74) *Attorney, Agent, or Firm* — Muncy, Geissler, Olds & Lowe, P.C.

(57) ABSTRACT

Disclosed is a water dispenser including a container with an out-let channel at the bottom thereof and a manually operated valve arrangement with a valve member resiliently pre-stressed towards a closing state.

11 Claims, 10 Drawing Sheets

(56) References Cited

U.S. PATENT DOCUMENTS

| | | | |
|---|---|---|---|
| 5,971,218 A * | 10/1999 | Le | B67D 3/04 |
| | | | 220/849 |
| 8,448,564 B2 | 5/2013 | Tart | |
| 10,266,381 B2 * | 4/2019 | Kim | B67D 1/0895 |
| 10,301,161 B2 * | 5/2019 | Lux | B67D 1/0004 |
| 2016/0244312 A1 | 8/2016 | Gallagher | |
| 2018/0118548 A1 | 5/2018 | Lux et al. | |

* cited by examiner

WATER CONTAINER WITH MANUAL DISPENSING VALVE

The present application claims priority to International Patent Application PCT/EP2021/057840 filed Mar. 25, 2021, and U.S. Provisional Patent Application No. 63/005,084, filed Apr. 3, 2020, each of which are herein incorporated by reference in their entirety.

FIELD OF THE INVENTION

The present invention relates to a water dispenser with a manually operable toggle valve with a valve member that is resiliently pre-stressed towards a closing state.

BACKGROUND OF THE INVENTION

Water dispensers are provided with a large variety of valve arrangement, including taps in which the valve is rotating and pre-stressed toggle valves. An example of the latter is disclosed in U.S. Pat. No. 8,448,564 where a valve member is arranged in a bottom cavity of the water container. A lever activates a stem that extends into the outlet channel of the valve arrangement so that toggling of the lever moves a valve member at the end of the stem to open an outlet channel inside the valve arrangement.

Typical for many dispensers is a relatively complex construction of the valve arrangement which elevates production costs. For example, in the above example U.S. Pat. No. 8,448,564, a valve arrangement is inserted into the side wall of the container and needs sealing between the container and the valve arrangement in addition to the sealing between the valve member and the valve seat inside the valve arrangement.

It would be desirable to provide a water dispenser with a valve arrangement that is simple in construction with few components.

DESCRIPTION/SUMMARY OF THE INVENTION

It is an objective to provide an improvement in the art. Especially, it is an objective to provide a valve arrangement and a water dispenser with such valve arrangement with a high degree of simplicity but high reliability. This is achieved with a water dispenser and valve arrangement as explained below and by a water dispenser as defined in the claims.

The water dispenser comprises a container for holding water for dispensing from the container. One use of such dispenser is dispensing of water after having been cooled down in a refrigerator in which the dispenser is placed.

Although, the container in principle can be formed like a sphere, the container would typically have well defined top, side wall and bottom, which define an inner volume of the container for holding the water. For example, the dispenser stands on the bottom when in use.

The container comprises an outlet channel at the bottom of the container for dispensing water from the inner volume through the outlet channel. The outlet channel has an upstream end in the inner volume inside the container for receiving water from the inner volume and a downstream end at an outer side of the container for dispensing the water from the container.

In some embodiments, the bottom and the side wall, or side walls, of the container are plastic moulded in one piece. A suitable material is polycarbonate, which also allows the container to be moulded in a solid and highly transparent material. However, other materials, for example polyolefins, are also possible candidates for moulding.

For example, the outlet channel and the side wall of the container, or one of the side walls in the event that the container has several side walls, are plastic moulded in one piece, which is advantageous in that no gaskets are necessary between the outlet channel and the container wall. A similar advantage is achieved, if the outlet channel is moulded in one piece with the bottom of the container and extends through the bottom.

In comparison, the above-mentioned disclosure in U.S. Pat. No. 8,448,564 requires a seal between the container and the valve arrangement that is inserted through an opening into the container wall.

The water dispenser comprises a manually operated valve arrangement so that manual interaction causes the valve arrangement to be opened for dispensing of water. The valve arrangement is further arranged to toggle between a closing state and an open state, typically such that the valve member is resiliently pre-stressed towards the closing state, and manual force is necessary to counteract the resilient pre-stressed closing state for shift towards an opening state.

In practical embodiments, a valve member is provided either at an upstream end or at a downstream end of the outlet channel. The valve arrangement is further arranged to toggle between a closing state where the upstream end or the downstream end of the outlet channel is obstructed by the valve member and an open state where the valve member is removed from its obstructing state for dispensing the water from the inner volume through the outlet channel. In these embodiments, the outlet channel also forms the valve seat for the valve member, which is an advantage in order to minimize the number of components for the dispenser, thereby reducing complexity and production costs.

Typically, the manual pressing or pulling action to toggle the valve is remote from the valve member. For example, the manually operated valve arrangement comprises a hinged lever arranged for manual push or pull of the lever against the pre-stressing force for changing the valve member from the closing to the open state.

In some practical embodiment, manual push or pull action is done on a first end of the lever for moving the valve member by the second end, where the hinge of the lever is located between the first and the second end. In some embodiments, the lever is arranged vertically and hinged horizontally so that a manual force is necessary for pushing or pulling the lever at its first end, which is arranged above the outlet channel. Alternatively, the lever is hinged in a direction different from horizontal, for example vertically, with a corresponding manual action of the lever remote from the outlet channel at some side of the outlet channel. It is preferred that the position for manual action is not below the outlet channel in order to provide easy dispensing from the outlet channel.

Optionally, the outlet channel is substantially horizontal and has a substantially horizontal flow direction. A useful further embodiment has been found in providing a small platform just underneath the outlet channel in order for the water to flow downwards from the outlet channel onto the platform during open state of the valve arrangement and for being dispensed to a user from the platform for consumptions. By using the platform, a smooth flow is achieved for the water, which is user friendly. For example, the platform is provided on an outer side of dispenser side wall and extending farther from the side wall than the outlet channel in order for the water to flow onto the platform even where there is a slight pressure on the water from the outlet channel.

Optionally, a frame is provided on the side wall of the dispenser and around the outlet channel. For example, the lever is hinged in this frame. In useful embodiments, the frame comprises the platform as an integral part of the frame, such as frame moulded in one piece with the platform. Optionally, the side wall of the container and the frame are plastic moulded in one piece such that also the platform is moulded in one piece with the side wall.

In some embodiments, the frame comprises two opposed side portions arranged on opposite sides of the outlet channel. Opposite sides here mean right and left of the outlet channel when the dispenser is in operational orientation for water dispensing. In some of these embodiments, the lever is horizontally hinged in the side portions, and the lever is oriented substantially vertically, rotating about the horizontal rotation axis as defined by the hinge.

For example, the frame comprises a profile above the outlet channel and extending from the side wall outwards and extending from one to the other of the side portions, thus extending from the left to the right, for example in a curved fashion that is concave downwards. The profile is provided and arranged for preventing water to flow upwards along the side wall and/or the frame during dispensing of water from the outlet channel and for guiding water from the outlet channel downwards for dispensing, for example for guiding water onto the platform in the event that such platform is provided.

Various embodiments are possible for a valve member. In some embodiments, the valve member is moulded from an elastomeric polymer and is sufficiently resilient and soft to provide a good tightening capability against the end of the outlet channel by the valve member without the necessity of additional gaskets, such as O-rings. For example, the valve member is made of silicone. In practical embodiments, the valve member comprises a resilient central part that obstructs the downstream end of the outlet channel in the closing state. Optionally, the valve member also has an upper part, advantageously a curved upper part, above the central part, where the upper part extends from the valve member towards the side wall and thus, forming, a roof above the downstream end of the outlet channel for preventing water to flow upwards along the valve member during dispensing of water from the outlet channel and for guiding water downwards for dispensing. Optionally, this upper part of the valve member is combined with the abovementioned profile between the sides of the frame, where both the profile and the upper part of the valve member are provided above the outlet channel and forming a double-roof system. In this case, these two roofs assist each other in preventing upwards flow of the water. For example, the upper part, such as curved upper part, of the valve member is located between the outlet channel and the profile.

In some practical embodiments, the valve member is fastened to the lever. In such embodiments, it is useful if a spring is arranged for acting on the lever in order for the lever to provide the resilient pre-stressing force on the valve member. The valve arrangement is then arranged for being opened by manual force acting on the lever and counteracting the pre-stressing force on the lever and, thus, also on the valve member.

If the dispenser is used for filtering water, this is optionally accomplished with an insert, for example a top insert, inserted into the container, where the insert comprises a receptacle for water to be filtered and a water filter compartment for a water filter. The insert is then arranged for receiving water to be filtered into the receptacle and for filtering water through the water filter and into the reservoir by gravity.

For course-filtering of the water from the receptacle, a pre-filter is used to catch debris. For fine filtering, the water filter comprises at least one fine filter for filtering microbes. For example, the pre-filter limit is in the range of 150-10 micrometer, typically 10 micrometers.

Optionally, the fine filter comprises a plurality of hollow fiber microfiltration and/or ultrafiltration membranes. Alternatively, the filter element comprises a roll of pleated microporous material with microfiltration or ultrafiltration purposes. It is recalled that an ultrafiltration filter has pores that filter particles of a size down to a minimum size, for example a minimum size in the range of 0.001 to 0.01 micrometer, whereas a microfiltration filter has pores that filter particles of a size down to a minimum size of around 0.1 micron.

For example, the fine filter is configured for filtering microbes that have a size below a predetermined water filter limit, wherein the predetermined water filter limit is in the range of 0.01 to 0.5 micrometer, optionally in the range of 0.05 to 0.2 micrometers. In order to assure a high flow of water through the filtration system microfiltration is preferred with a filtration of particles having a size down to 0.1 micrometer.

Advantageously, bacteria are reduced by 99.9999% (log 6). Optionally, viruses are reduced by 99.99% (log 4). Optionally protozoan and parasites are reduced by 99.9% (log 3). Advantageously, all three criteria are met.

SHORT DESCRIPTION OF THE DRAWINGS

The invention will be explained in more detail with reference to the drawing, wherein.

DETAILED DESCRIPTION/PREFERRED EMBODIMENT

Figure 1A:
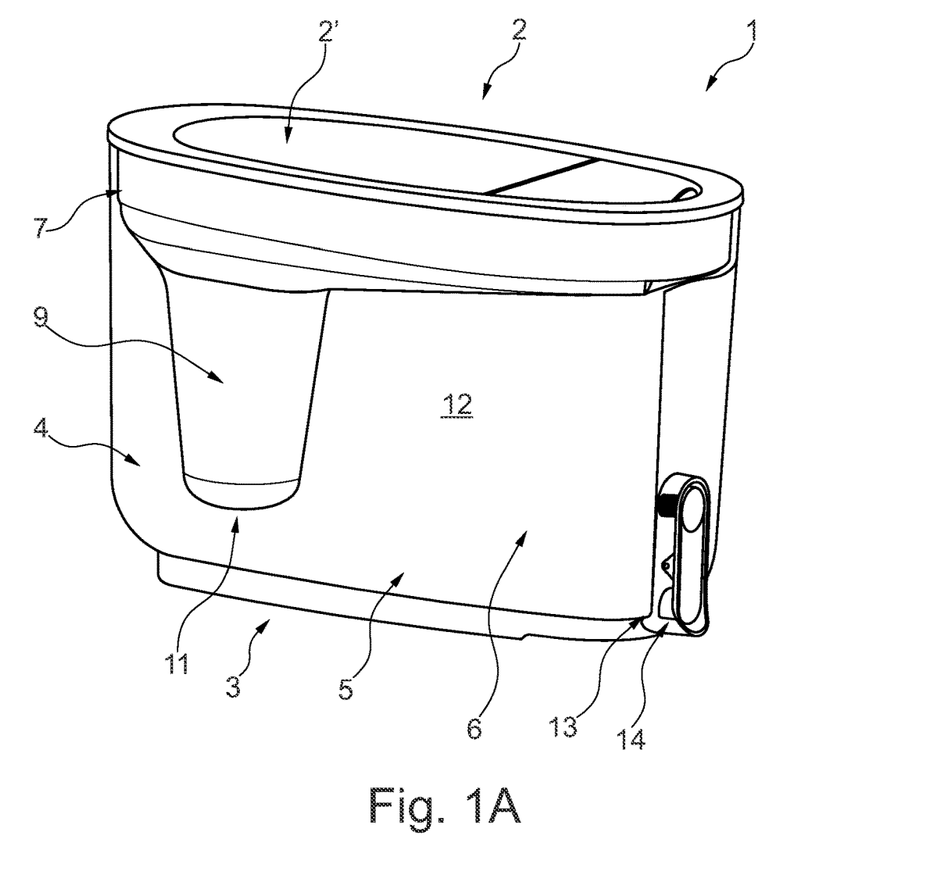
FIG. 1A illustrates a water dispenser.

FIG. 1A illustrates a dispenser 1 having a top 2 comprising a lid 2' and a bottom 3 on which it stands when in use, as well as side walls 4, which in common define a container 5 with an inner volume 6 for water.

Figure 1B:
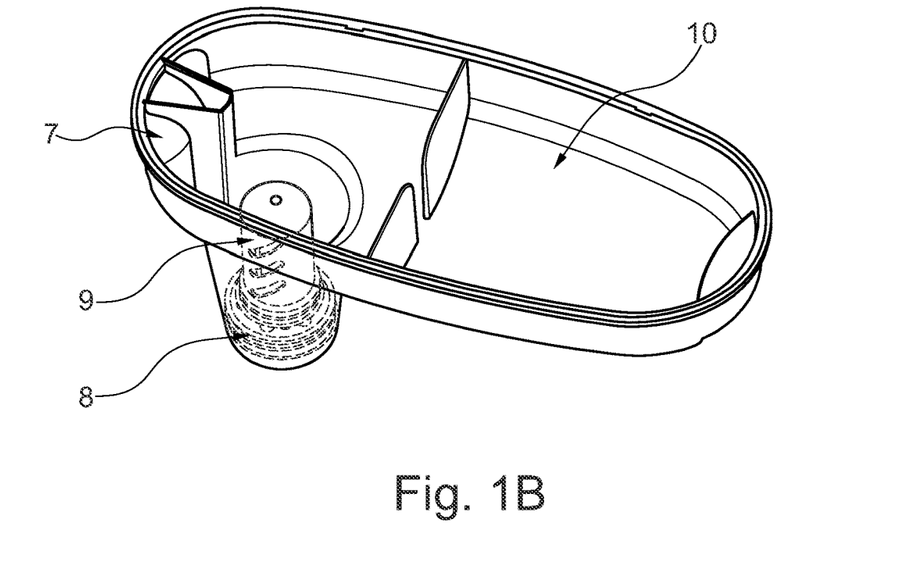
FIG. 1B illustrates a top insert for the dispenser.

The dispenser 1 comprises a top insert 7, which is shown in greater detail in FIG. 1B. The top insert 7 is optional and useful when filtering water before consumption, as it comprises a water filter 8 for filtering water inside a filter compartment 9. When such a top insert 7 is used for the dispenser 1, water is filled into an upper dirt water receptacle 10 from which the dirt water to be filtered is entering the filter compartment 9 and the filter 8 for finally leaving the filter compartment 9 as filtered water through a filter exit 11 at the bottom of the filter compartment 9 from which it flows into the clean water tank 12 of the container 5. From the clean water tank 12, the water can be dispensed through a water outlet 13 typically arranged at the bottom 3 of the clean water tank 12 in order to be able to entirely empty the clean water tank 12 through the water outlet 13. The water outlet 13 is covered by a valve arrangement 14.

In the shown embodiment, the dispenser 1 is dimensioned and formed to fit into a refrigerator for cooling the water before dispensing it through the water outlet 13.

The bottom 3 and side walls 4 of the container 5, as illustrated in FIG. 1, are advantageously formed as a single piece that is moulded in polymer, for example transparent polymer in order for the user to observe the water level in the container 5.

Figure 2A:
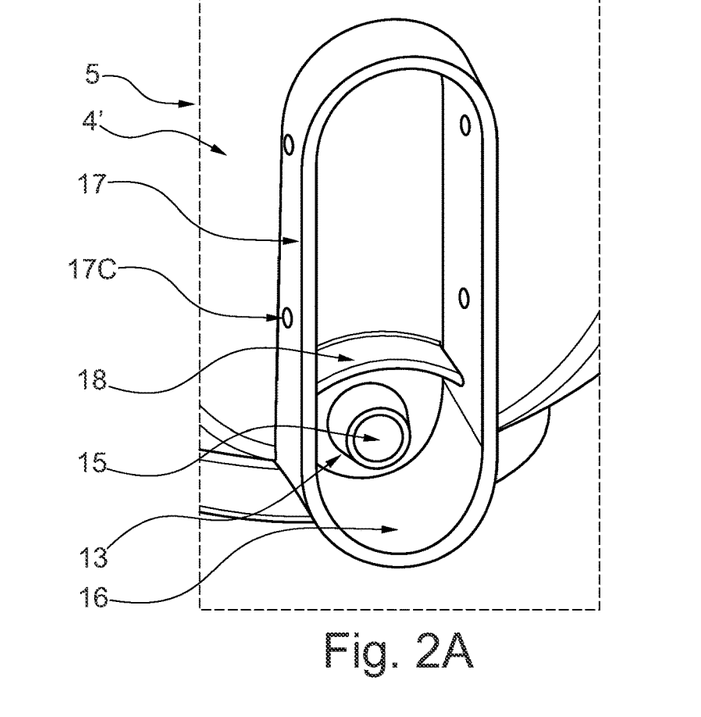
FIG. 2A shows a front part of a moulded container.

FIG. 2A illustrates that the front of the container 5 comprises a frame 17, moulded integrally in one piece with the foremost side wall 4'. The frame 17 extends outwardly from the foremost side wall 4' and forms a mechanical basis for holding the valve arrangement 14. The valve arrangement 14 toggles between closing and opening an outlet channel 15 of the water outlet 13. When water leaves the container 5 through the outlet channel 15, the water falls onto a platform 16, for example a curved platform, as illustrated, which is arranged below the outlet channel 15 and which extends farther from the foremost side wall 4' than the outlet channel 15. From the platform 16, water is dispensed to the user. The platform 16 is illustrated as a part of the frame 17, which is, therefore, simple in construction and yields a high mechanical stability.

Above the outlet channel 15, there is provided a profile 18 which is used as a roof above the outlet channel 15 for preventing water to flow upwards and for guiding the water downwards towards the platform 16. The profile 18 extends between opposite sides of the frame 17.

Figure 2B:
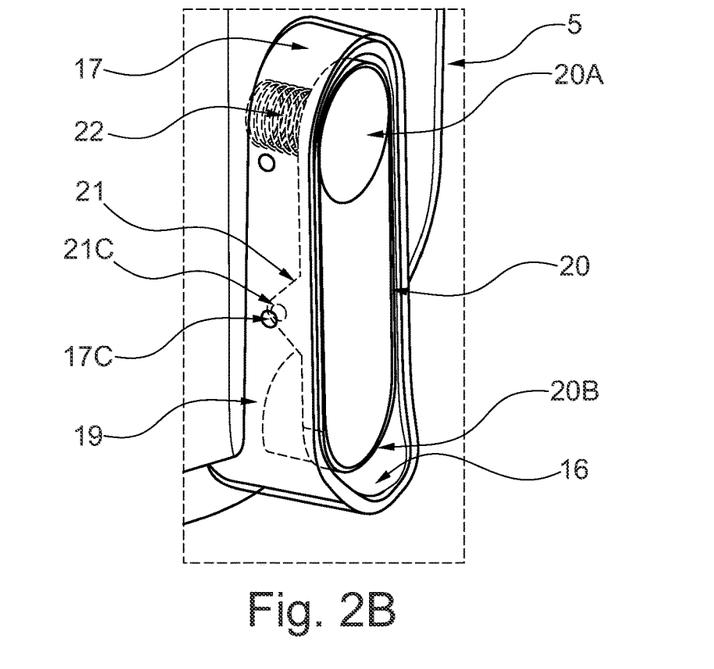
FIG. 2B illustrates the frame on the front part and a lever and valve member mounted.

FIG. 2B illustrates a valve arrangement 14 mounted to the frame 17, where the walls of the container 5 and the frame 17 are moulded in a transparent polymer material. The valve arrangement 14 is simple in its construction and comprises in the shown embodiment only three parts, namely a lever 20, a valve member 19, and a helical spring 22.

The lever 20 comprises a hinge profile 21 on either longitudinal side of the lever 20. The hinge profile 21 comprises a protrusion 21C that cooperates with a corresponding opening 17A in the frame 17 for rotational movement of the hinge profile 21 around an axis extending through the openings 17A of the two sides of the frame 17. For mounting the lever 20, the hinge profiles 21 are slightly pressed towards each other so that the hinge profiles 21 with the protrusions 21C fit in into the space defined by the sides of the frame 17, and the protrusions 21C snap into the cooperating openings 17C.

When the first, upper end (20A) of the lever 20 is pressed inwards by a finger against the pre-stressed force of the spring 22, the second, lower end (20B) moves outwards away from the container 5, and the valve member 19 will be lifted away from the downstream end 15B of the channel 15 and open for flow of water through the outlet channel 15 and down onto the platform 16, from where the water is received by the user for consumption.

Figure 2C:
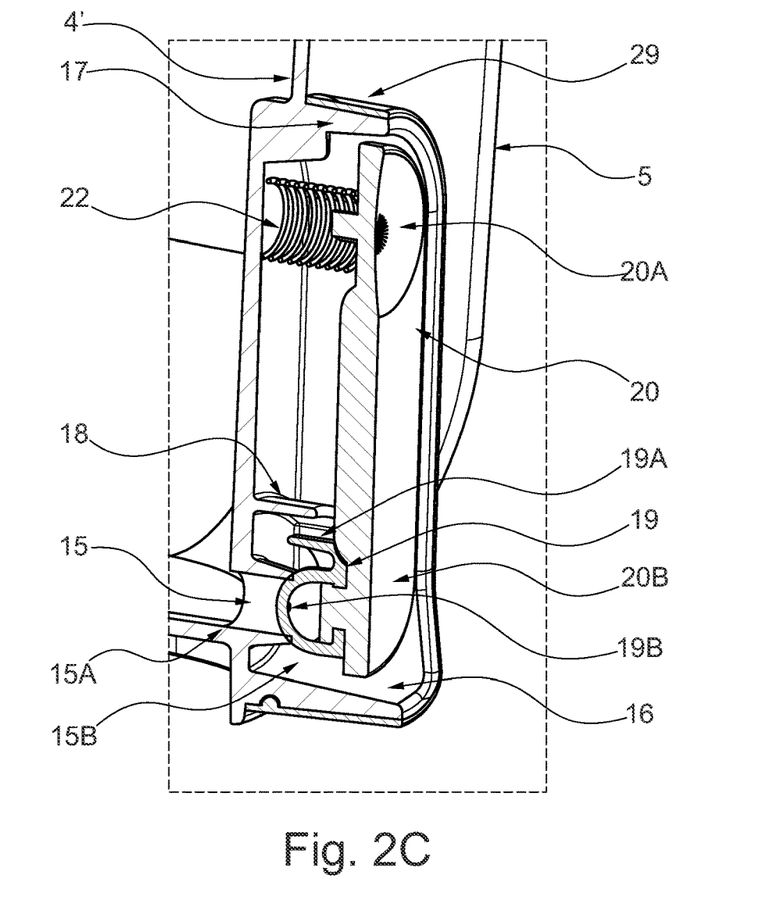
FIG. 2C is a sectional view of the lever mounting.

FIG. 2C illustrates sectional view through the frame 17 and the lever 20 as well as the spring 22 and the valve member 19. The drawing illustrates that not only the profile 18 that creates a roof over the outlet channel 15 prevents water from flowing upwards along the lever 20, but that also the valve member 19 with its upper cylindrical part 19A covers the area above the outlet channel and captures water and guides it downwards to the platform 16. Centrally, a bulb-formed resilient part 19B forms a gasket against the downstream end 15B of the outlet channel 15.

Figure 2D:
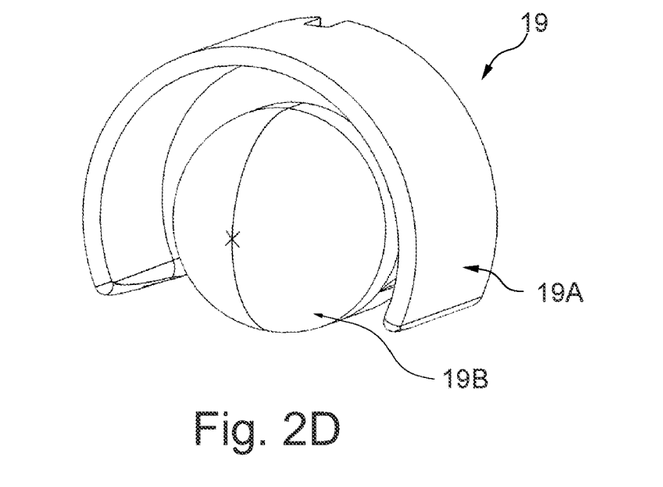
FIG. 2D is a font view of the valve member.

FIG. 2D shows a perspective view of the valve member 19, showing the cylindrical part 19A that extends over an angular span in the range of 180-270°, which is sufficient as a good barrier for preventing water from flowing upwards.

Figure 2E:
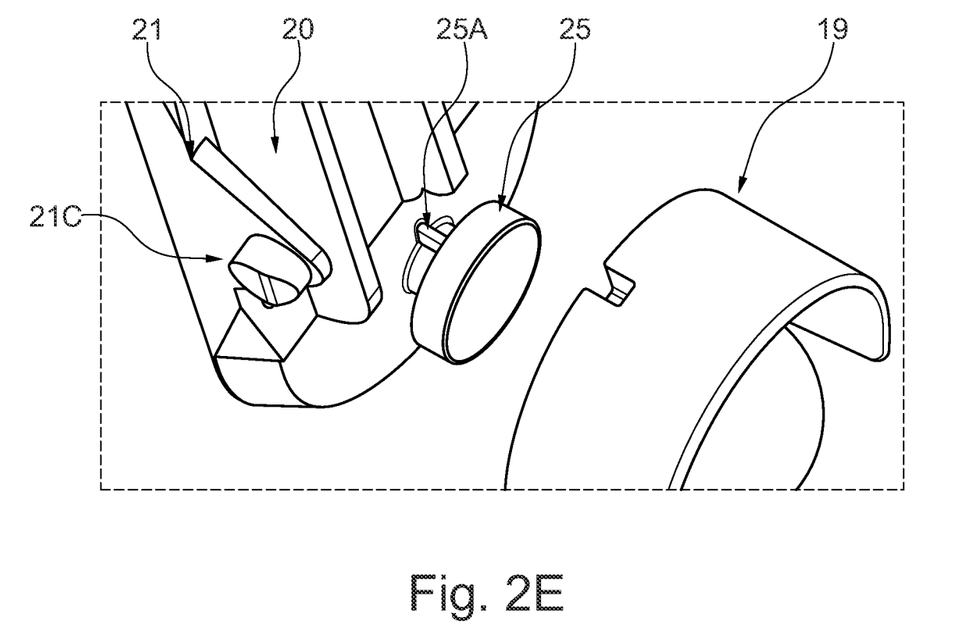
FIG. 2E illustrates the mounting principle of the valve member.
Figure 2F:
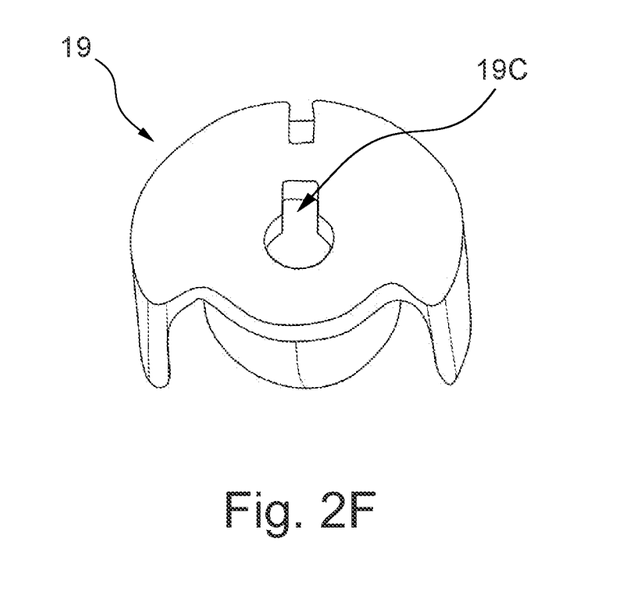
FIG. 2F shows the valve member from the back.

FIG. 2E and FIG. 2F illustrate the valve member 19 and its mounting in a detailed image. The valve member 19 comprises a notch 19C fitting with a corresponding protrusion 25A on the retainer 25 onto which the resilient valve member 19 is mounted by pressing the resilient elastomeric valve member 19 over the cylindrical edge of the retainer 25. The cooperation of the groove 19C and the retainer protrusion 25A assures that the valve member 19 is mounted in a correct orientation.

Figure 2G:
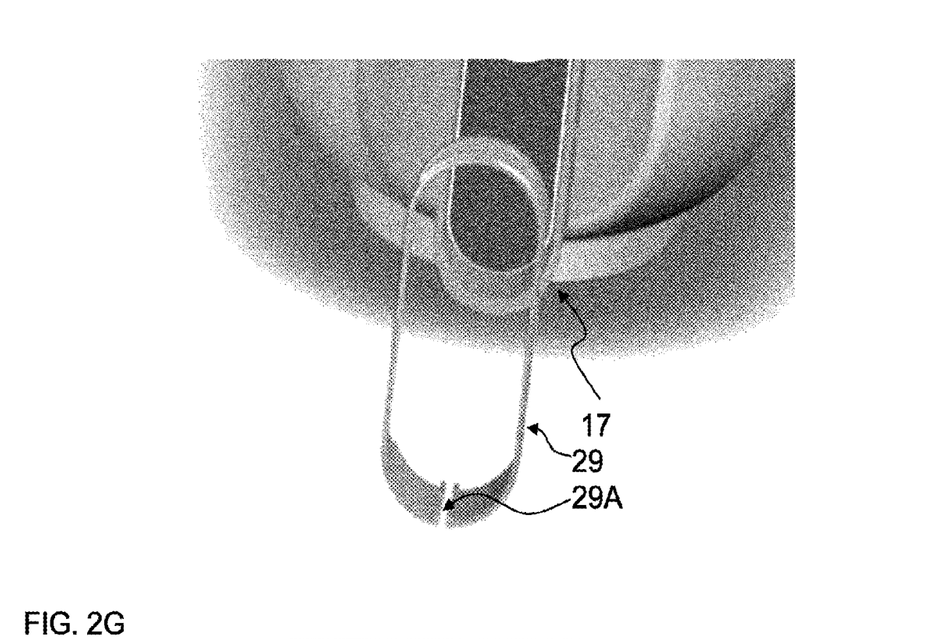
FIG. 2G illustrates a cover for the frame.

FIG. 2G illustrates a cover 19 for the frame 17, where the cover 29 is pushed over the frame 17 and held in place. A slit 29A in the cover 29 eases mounting.

Figure 2H:
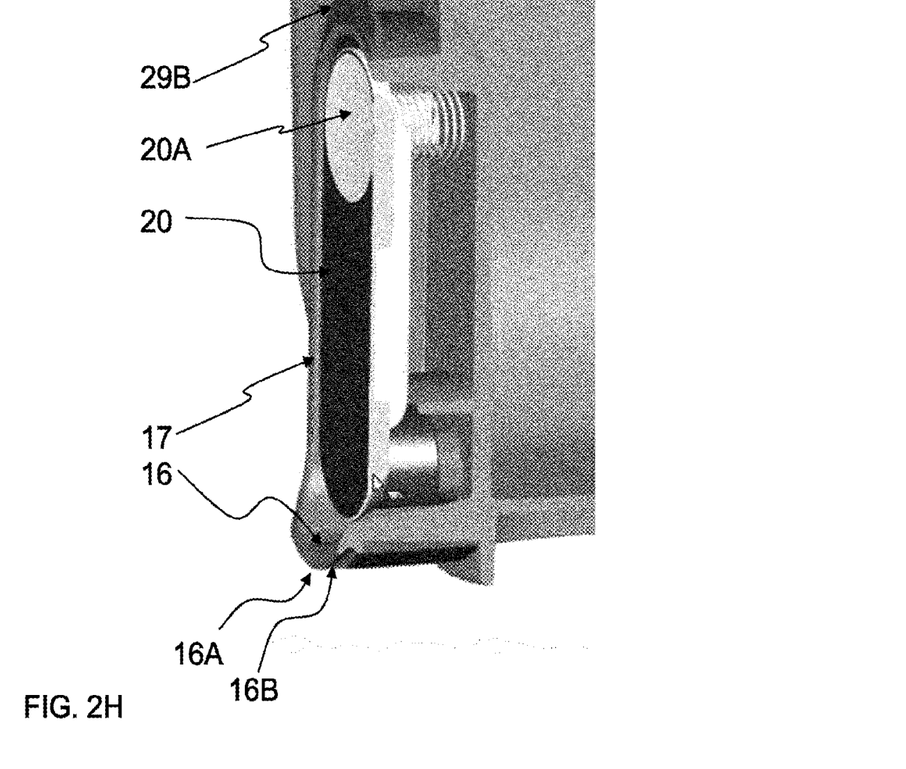
FIG. 2H is a sectional view of an alternative embodiment.

FIG. 2H illustrates a cover 29, which comprises an edge 29B at it upper side in order to make it easier for the user to operate the valve arrangement 14. A user would, thus, place one or two fingers behind the upper edge 29B and press with the thumb against the first end (20A) of the lever 20.

Figure 3A:
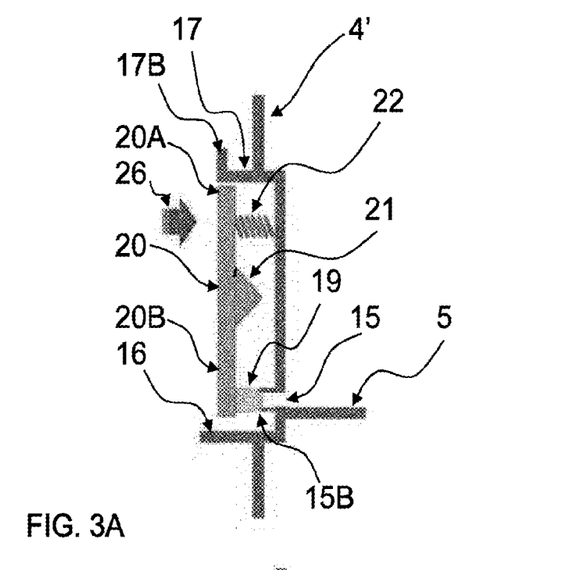
FIG. 3A is a principle sketch of a first embodiment of a valve arrangement.

FIG. 3A illustrates a first principle for the valve arrangement 14 where, instead of the upper edge 29B of the cover 29, there is such an edge 17B for ease of operation integrated in the frame 17 itself. The valve arrangement 14 comprises a valve member 19 fastened to the second end of a lever 20 that has a hinged profile 21 and is pre-stressed by a helical coil spring 22 into its closed position. In this embodiment, the valve member 19 closes the downstream end 15B of the outlet channel 15. In order to keep the valve member 19 pre-stressed against the downstream end 15B of the outlet channel 15, the spring 22 is located between the hinged profile 21 and the first end (20A) of the lever 20 and compressed in order to exert force on the first end (20A) of the lever 20 by expansion of the spring 22. The expansion force of the spring presses the valve member 19 against the downstream end 15B of the outlet channel 15.

Figure 3B:
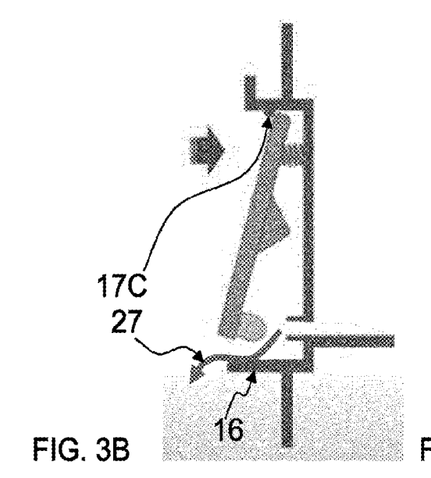
FIG. 3B is a principle sketch of a slight modification of the first embodiment.

FIG. 3B illustrates the functioning of the first principle for the valve arrangement 14 of FIG. 3A in that a manual push with a finger, for example thumb, against the upper, first end (20A) of the lever 20 removes the valve member 19 from the downstream end 15B of the outlet channel 15, so that water can flow unhindered through the outlet channel 15 and down onto the platform 16, as illustrated by an arrow 27.

FIG. 3B show a further feature in addition to the features in FIG. 3A, namely a protrusion 17C on the frame 17, where the protrusion 17C in cooperation with the first end (20A) of the lever 20 forms a snap holder when the second end (20B) of the lever 20 is resiliently pressed under the protrusion 23 by manual force, and where the protrusion 23 holds the lever 20 in the valve-open orientation because the force of the spring 22 is not sufficient for returning the lever 20 pass the protrusion 23. An additional manual press on the first end (20B) of the lever 20 is necessary in order to close the valve arrangement 14 again.

Figure 3C:
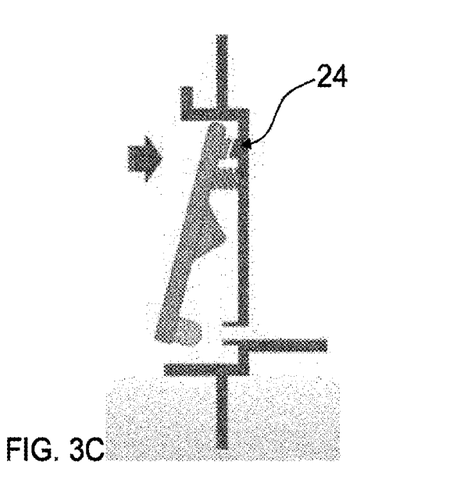
FIG. 3C is a principle sketch of a further slightly modification of the first embodiment.

FIG. 3C illustrates an alternative to the embodiment in FIG. 3B in which a magnet 24 is used as an alternative to the protrusion 23, and where the magnetic force is sufficiently strong to counteract the force of the spring 22 and hold the lever 20 in place when the first end (20A) of the lever 20 is attached to the magnet 24.

Figure 3D:
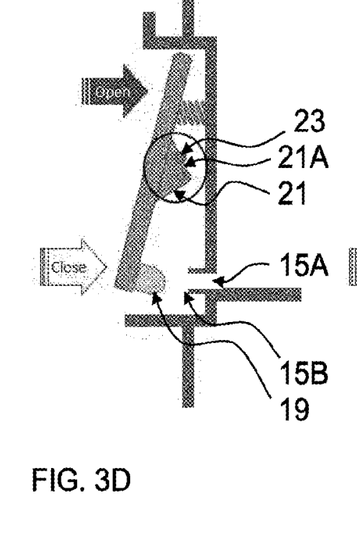
FIG. 3D shows a valve arrangement example based on modifying the first embodiment.

FIG. 3D shows a further alternative feature in addition to the features in FIG. 3A, namely a snap holder 23 at the hinged profile 21. When the lever 20 is operated by a manual pushing force against the first end (20A) of the lever 20, an edge 21A of the hinged profile 21 is moved pass a protrusion 23 which due to deformation force holds the lever 20 in place, until a manual pushing counterforce against the second end (20B) of the lever 20 is bringing the lever 20 into the closed state orientation where the valve member 19 at the end of the stem 25 is again closing the downstream stream end 15B of the outlet channel 15.

Figure 3E:
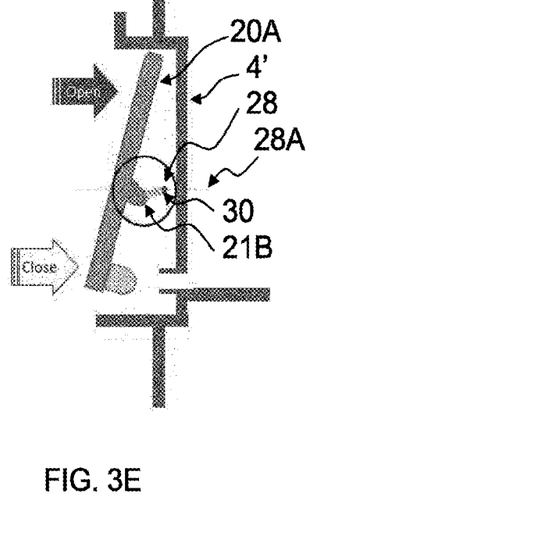
FIG. 3E shows another valve arrangement example based on modifying the first embodiment.

FIG. 3E illustrates an alternative embodiment, where a spring 30 is connecting a holding point 28 on the foremost side wall 4' of the container 5 with an angled arm 21B of the hinge profile 21 in a knee-joint configuration. In the open configuration, as shown, the holding spring 30 is compressed and exerts an expanding, pushing force in order to hold the lever 20 in an open state of the valve arrangement. During manual pushing of the second end (20B) of the lever 20, the holding spring 30 is first further compressed, until the spring 30 in upward motion passes a dead point line 28A, after which is expands again during further manual pushing of the second end (20A) of the lever 20, after which that the holding spring 30 then holds the lever 20 in an orientation where the lever keeps the valve arrangement 14 in an closing state.

Figures 4A, 4B:
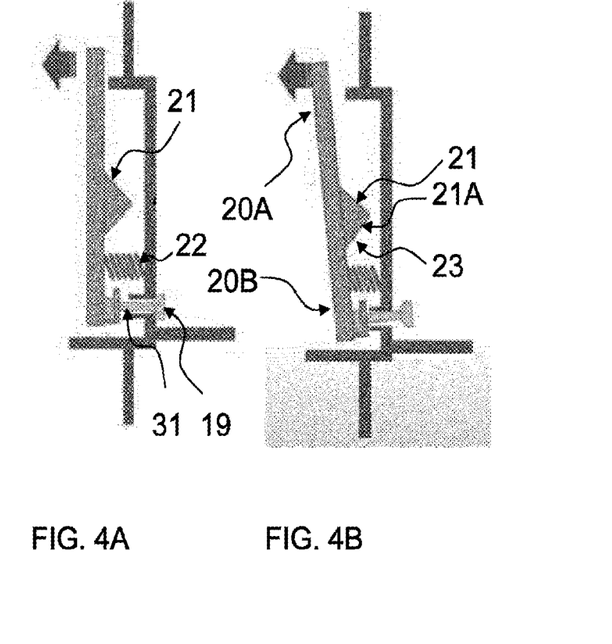
FIG. 4A is a principle sketch of a second embodiment of a valve arrangement.
FIG. 4B is a principle sketch of a slight modification of the second embodiment.

FIG. 4A illustrates a second principle for the valve arrangement 14. In this case, the valve arrangement 14 comprises a valve member 19 connected to the end of a stem 31 that is attached with its one end to the second end (20B) of the lever 20. Also, in this embodiment, the lever 20 is hinged in a hinged profile 21 and pre-stressed by a helical coil spring 22 into its closed position, where the valve member 19 closes the outlet channel 15. However, in contrast to the embodiment of FIG. 3A, the valve member closes the upstream end 15A of the outlet channel 15. In order to keep the valve member 19 pre-stressed against the upstream end 15A of the outlet channel 15, the spring 22 is located between the hinge profile 21 and the second end (20B) of the lever 20 and compressed in order to exert force on the second end (20B) of the lever 20 by extension of the spring.

FIG. 4B shows a further feature in addition to the features in FIG. 4A, namely a snap holder 26 at the hinged profile 21. When the lever 20 is operated by a manual pulling force, an edge 21A of the hinged profile 21 is moved pass a protrusion 23 which due to deformation force holds the lever 20 in place, until a manual pushing counterforce at the first end (20A) of the lever 20 is bringing the lever 20 into the closed state orientation where the valve member 19 at the end of the stem 25 is again closing the upstream end 15A of the outlet channel 15.

Figure 4C:
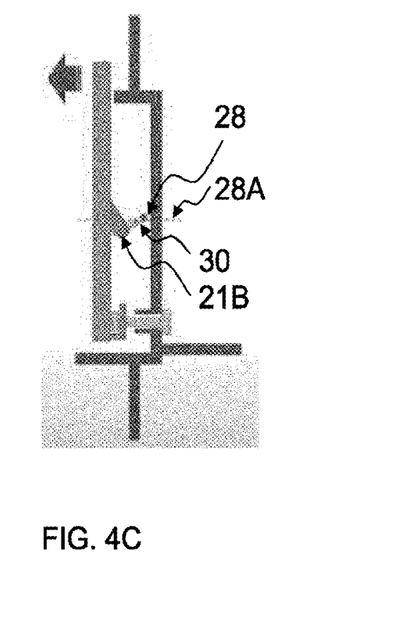
FIG. 4C is a principle sketch of a further modification of the second embodiment.

FIG. 4C illustrates an alternative embodiment, where a spring 30 is connecting a holding point 28 on the foremost side wall 4' of the container 5 with an angled arm 21B of the hinge 21 in a knee-joint configuration. The holding spring 30 is compressed when the lever 20 holds the valve arrangement 14 in the closed state. During manual pulling of the first end (20A) of the lever 20, the holding spring 30 is first compressed, until the spring passes a dead point line 28A, after which is expands during further manual pulling of the first end (20A) of the lever 20, so that the holding spring 30 then holds the lever 20 in an orientation where the pre-stressed lever 20 keeps the valve arrangement 14 in an open state. A manual pushing force is necessary at the first end (20A) of the lever 20 in order to bring the lever 20 into the orientation where the lever 20 holds the valve arrangement 14 in a closed state.

Figure 5:
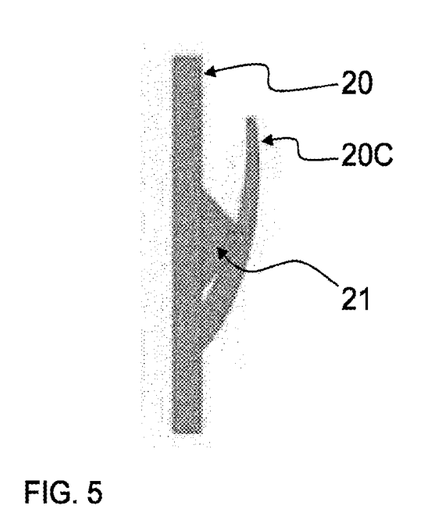
FIG. 5 illustrates a further embodiment of a lever.

FIG. 5 illustrates an alternative embodiment for a lever 20, in which a leaf spring 20C is integrated as part of the lever 20 material. The leaf spring 20C has a similar function as the helical coil spring 22 explained above.

Figure 6:
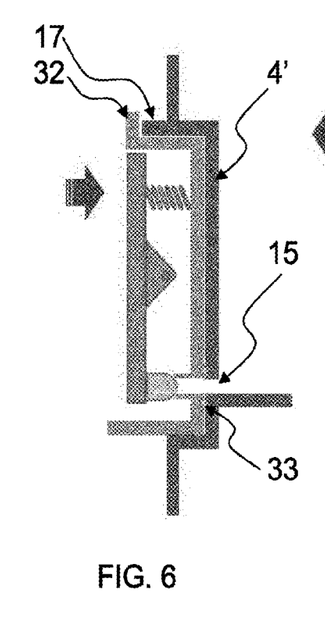
FIG. 6 illustrates a non-integrated valve arrangement.

In the above examples, the lever 20 was held by its hinge profiles 21 inside the frame 17. In the Example of FIG. 6, the valve member 19 and the lever 20 are integrated in a valve insert unit 33, which is mounted, for example pressed, into the frame 17. In order to make the connection between the outlet channel 15 and the valve insert unit 32 watertight, a gasket is used between the downstream end 15B of the outlet channel 15 and the valve insert unit 32.

Figure 7:
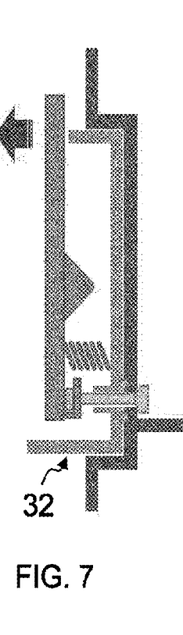
FIG. 7 illustrates an alternative non-integrated valve arrangement.

FIG. 7 also illustrates a valve insert unit 32, resembling the lever and valve principle of FIG. 4A.

Figure 8:
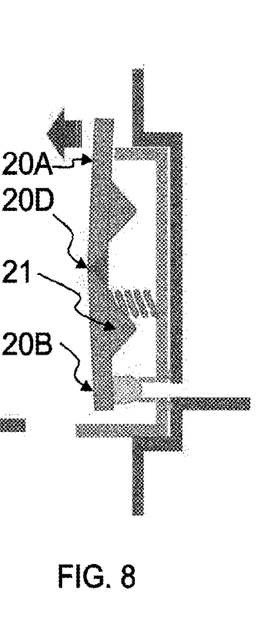
FIG. 8 illustrates a further alternative non-integrated valve arrangement.

FIG. 8 illustrates a valve insert unit 32 which uses a different principle for the lever action in that the lever 20 has a central joint 20D and two hinge profiles 21 on either longitudinal edge of the lever 20. Pull at the first end 21A of the lever 20 results in a motion of the second end (20B) in the same direction.

Figure 9A:
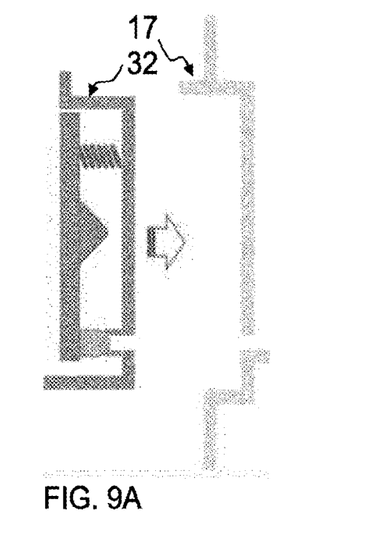
FIG. 9A illustrates a first mounting principle of the non-integrated valve arrangement.
Figure 9B:
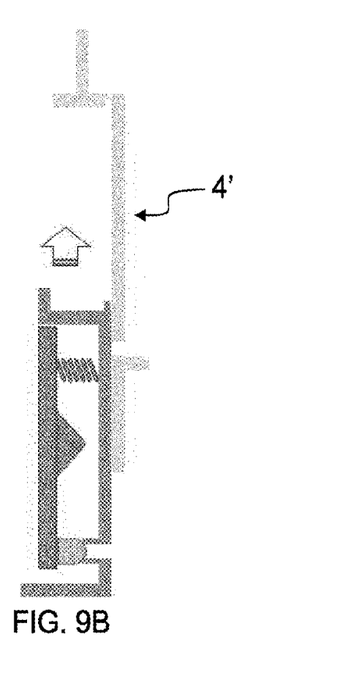
FIG. 9B illustrates a second mounting principle of the non-integrated valve arrangement.

FIG. 9A and FIG. 9B illustrate mounting principles of the valve insert unit 32. In FIG. 9A, the valve insert unit 32 is pushed into the frame 17 in a lateral direction, whereas in FIG. 9B, the valve insert unit 32 is pushed into the frame 17 in a direction parallel with the foremost side wall 4'. The latter, however, requires a slight modification of the frame 17 as compared to the embodiments above.

Figure 10A:
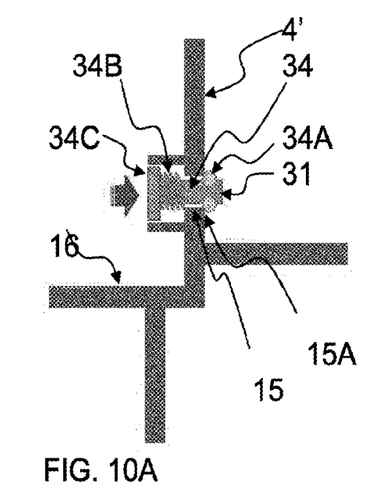
FIG. 10A illustrates a separate valve in the water channel.

FIG. 10A illustrates an enlarged view of a valve 34 that is mounted in the foremost side wall 4'. The valve 34 comprises a valve stem 31, around which an O-ring 34A is provided for tightening against the upstream end 15A of the outlet channel 15. Pushing against the head 34C of the valve 34 will move the O-ring 34A into the container 5 and away from the upstream end 15A of the outlet channel 15 so that water can flow through the outlet channel 15. The O-ring 34A in cooperation with the stem 31 cover the entrance to the outlet channel 15 at its upstream end 15A and therefore constitute a closing valve member 19, taking a role similarly to the one that was discussed above in relation to FIG. 2.

Figure 10B:
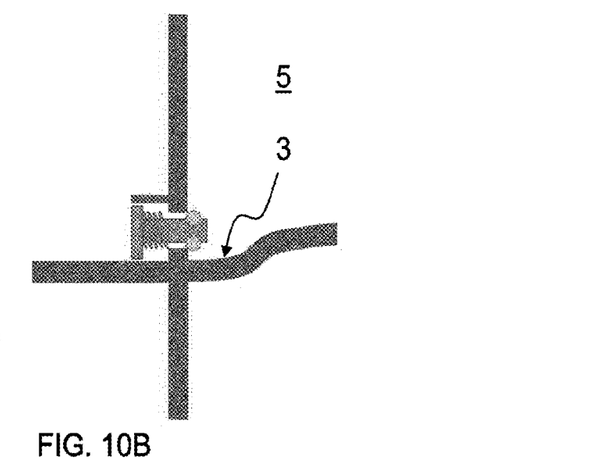
FIG. 10B illustrates a slight modification of the embodiment of FIG. 10A.

FIG. 10B illustrates a slightly different valve arrangement where the valve is closer to the bottom 3 of the container 5 in order to make sure that substantially all water can be emptied through the valve 34.

Figure 10C:
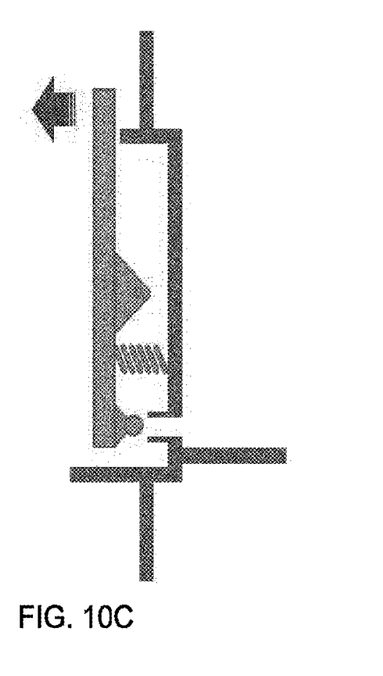
FIG. 10C illustrates a lever arrangement for the embodiments of FIGS. 10A and 10B.

FIG. 10C illustrates a lever 20 that can be used to push the head 34C of the valve of FIG. 10 inwards. Notice that the valve itself is not shown in FIG. 10C for simplicity, however, the lever can be used for both valve arrangements of FIG. 10A and FIG. 10B.

REFERENCE NUMBERS 1 dispenser
2 top of container 5
3 bottom of container 5
4 side walls of container 5
4' foremost side wall
5 container
6 inner volume of container 5
7 top insert
8 water filter
9 filter compartment
10 dirt water receptacle
11 filter exit
12 clean water tank
13 water outlet
14 valve arrangement
15 outlet channel
15A upstream end of channel
15B downstream end of channel
16 platform
17 pre-moulded frame
17A snap protrusion of frame 17 (optional)
17B upper edge of frame 17 for facilitating manual operation of the valve
17C opening in pre-moulded frame 17 for cooperation with protrusion 21C
18 profile above channel
19 valve member
19A cylindrical part of valve member 19
19B bulb-formed gasket part of valve member 19
19C notch of valve member 19
20 lever
20A first end of lever 20
20B second end of lever 20
20C integrated spring in lever 20
20D Central joint of lever 20
21 hinge profile of lever 20
21A edge of hinge profile
21B arm of hinge profile
21C protrusion of hinge profile
22 helical coil spring
23 protrusion to form snap holder in cooperation with the edge 21A of the hinge
24 magnet
25 retainer for valve member 19
25A top protrusion of retainer 25
26 arrow illustrating manual push action
27 arrow illustrating water flow
28 holding point
28A dead point line
29 cover for frame 18
29A slit in cover 29 for easy mounting
29B upper edge of cover for easing manual pressure
30 holding spring
31 valve stem
32 valve insert unit
33 gasket between valve insert unit 32 and foremost side wall 4'
34 separate valve
34A O-ring of separate valve 34
34B valve spring
34C head of valve 34

The invention claimed is:

1. A water dispenser comprising:
a container configured to hold water for dispensing, the container having a top, a side wall, and a bottom defining an inner volume, the container comprising an outlet channel at the bottom of the container for dispensing the water from the inner volume through the outlet channel, the outlet channel having an upstream end in the inner volume inside the container and a downstream end at an outer side of the container;
a manually operated valve arrangement with a valve member either at the upstream end or at the downstream end of the outlet channel, the valve arrangement being configured to toggle between a closing state where the upstream end or the downstream end of the outlet channel is obstructed by the valve member and an open state where the valve member is removed from obstructing the outlet channel for dispensing the water from the inner volume through the outlet channel; and
a frame on the side wall and around the outlet channel, wherein the frame comprises a platform provided on an outer side of the side wall and located underneath the outlet channel,
wherein the valve member is pre-stressed by a resiliently pre-stressing force towards configuring the valve arrangement in the closing state,
wherein the manually operated valve arrangement comprises a hinged lever configured to, based on a manual force acting on the lever, move the valve member by the lever against the pre-stressing force for changing the valve arrangement from the closing state to the open state,
wherein the platform extends farther from the side wall than the outlet channel,
wherein the platform is arranged for the water from the outlet channel flowing downwards onto the platform during the open state of the valve arrangement and for being dispensed to a user from the platform for consumption, and
wherein the lever is hinged inside the frame.

2. The water dispenser according to claim 1,
wherein the lever has a first lever end and a second lever end,
wherein the lever is hinged by a hinge profile arranged between the first lever end and the second lever end, and
wherein the second lever end is configured to push or pull the valve member from a pre-stressed closing position to an open position upon the manual force acting on the first lever end of the lever.

3. The water dispenser according to claim 1, wherein the outlet channel is configured to allow the water to flow therethrough along a horizontal flow direction.

4. The water dispenser according to claim 1, wherein the side wall of the container and the frame are plastic molded in one piece.

5. The water dispenser according to claim 1,
wherein the frame comprises two side portions arranged on opposite sides of the outlet channel, wherein the lever is hinged in the side portions along a horizontal axis, and wherein the lever is oriented vertically.

6. The water dispenser according to claim 5, wherein the frame comprises a profile above the outlet channel, extending from the side wall, and extending from one to the other of the side portions, the profile being configured to prevent the water to flow upwards along the side wall and/or the frame during dispensing of the water from the outlet channel and configured to guide the water from the outlet channel downwards for dispensing.

7. The water dispenser according to claim 6, wherein the valve member comprises:

a resilient central part that is configured to obstruct the downstream end of the outlet channel based on the valve arrangement being in the closing state; and an upper part above the central part, wherein the upper part extends from the valve member towards the side wall and forms a roof above the downstream end of the outlet channel for preventing the water to flow upwards along the valve member during dispensing of the water from the outlet channel and for guiding the water downwards for dispensing.

8. The water dispenser according to claim 7, wherein the upper part of the valve member is located between the outlet channel and the profile.

9. The water dispenser according to claim 1, wherein the valve member is fastened to the lever, wherein a spring is configured to act on the lever to provide the resilient pre-stressing force on the valve member via the lever, and wherein the valve arrangement is configured to be opened by the manual force acting on the lever and counteracting the pre-stressing force.

10. The water dispenser according to claim 1, further comprising a top insert inserted into the container from the top of the container, the top insert comprising:

a receptacle for the water to be filtered; and a water filter compartment for a water filter, wherein the top insert is configured to receive the water to be filtered into the receptacle and is configured to filter the water through the water filter and into a reservoir by gravity.

11. The water dispenser according to claim 1, wherein the valve member comprises:

a resilient central part that is configured to obstruct the downstream end of the outlet channel based on the valve arrangement being in the closing state; and an upper part above the central part, wherein the upper part extends from the valve member towards the side wall and forms a roof above the downstream end of the outlet channel for preventing the water to flow upwards along the valve member during dispensing of the water from the outlet channel and for guiding the water downwards for dispensing.

* * * * *